E. B. CHAPMAN.
MAGNETIC STRAINER APPARATUS FOR SEPARATING SOLIDS FROM LIQUIDS.
APPLICATION FILED NOV. 9, 1921.
1,425,366.
Patented Aug. 8, 1922.
5 SHEETS—SHEET 2.
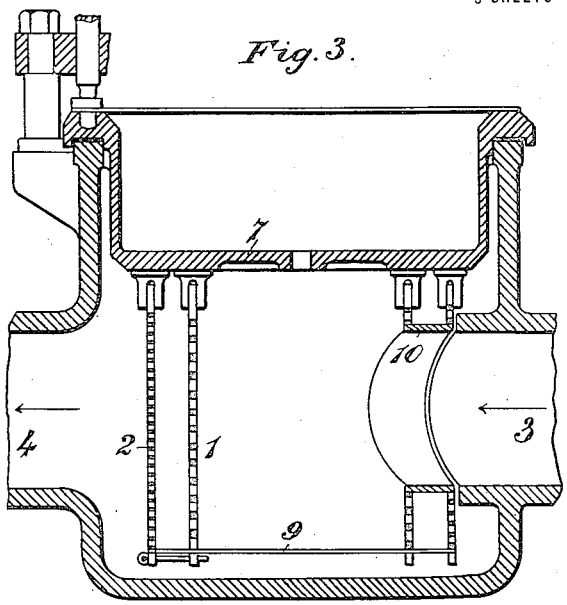
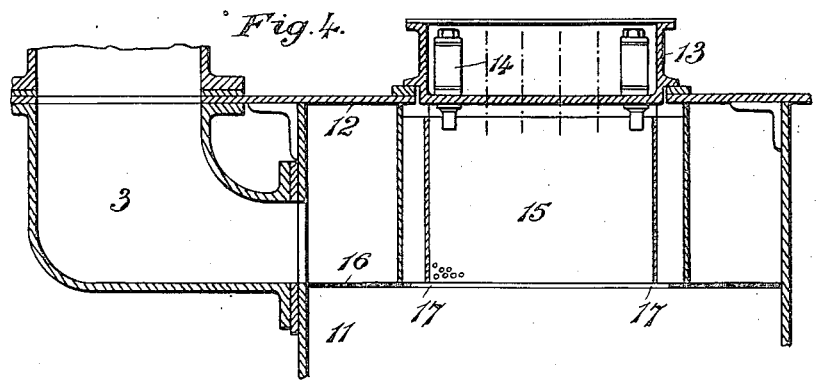
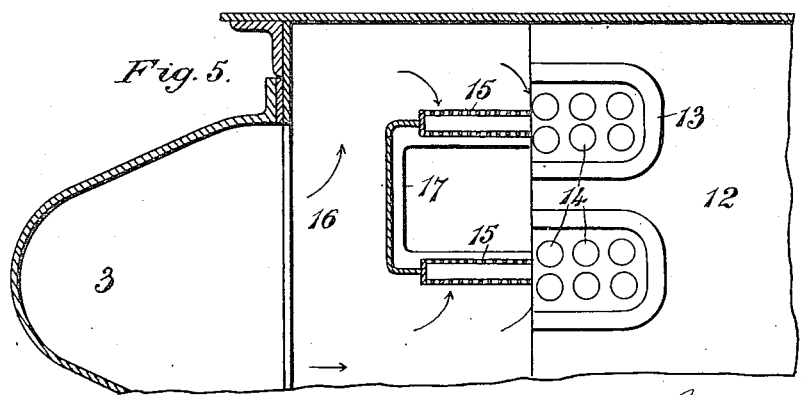
Inventor
Edward B. Chapman
By Herbert H. T. Jenner
Attorney.

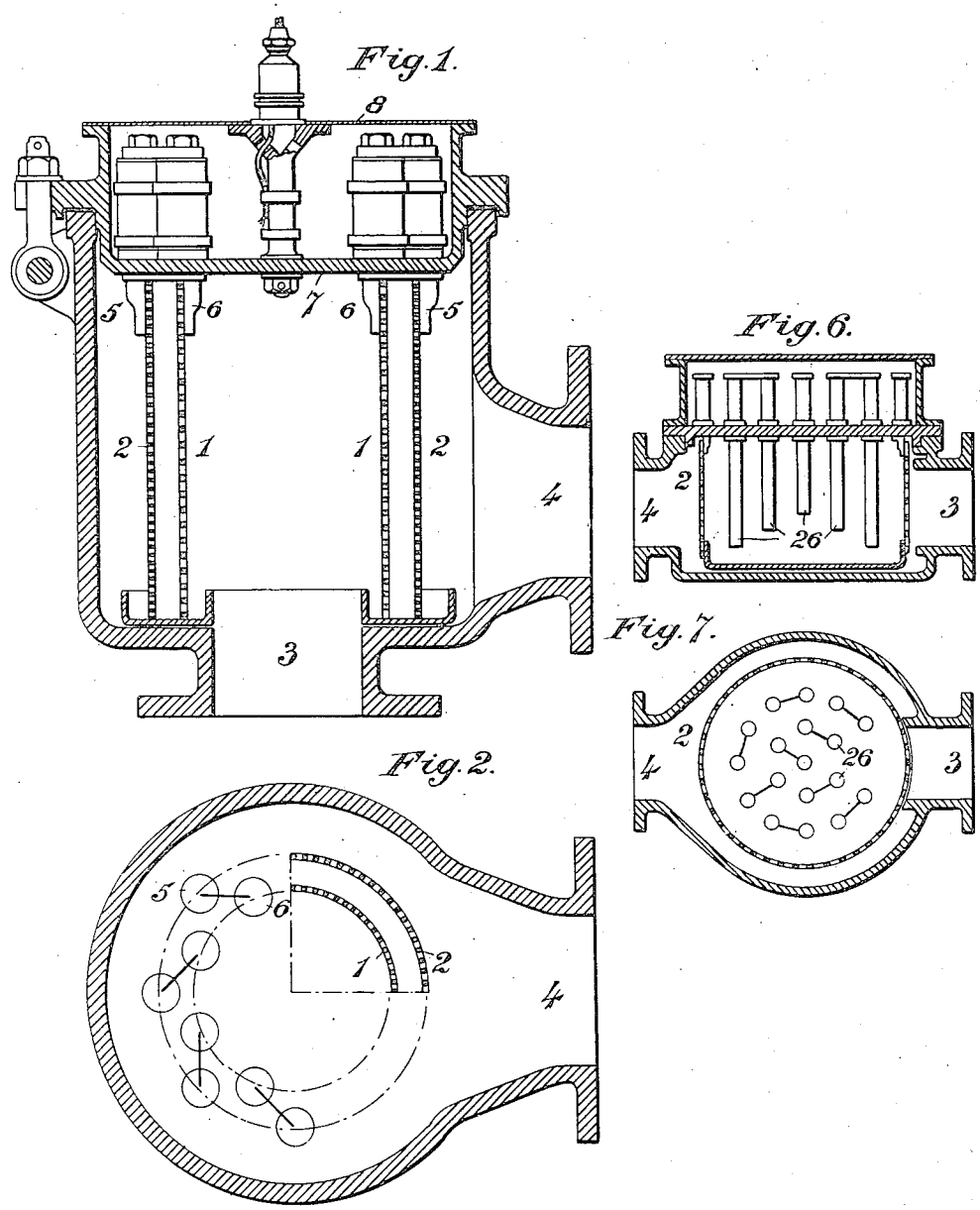

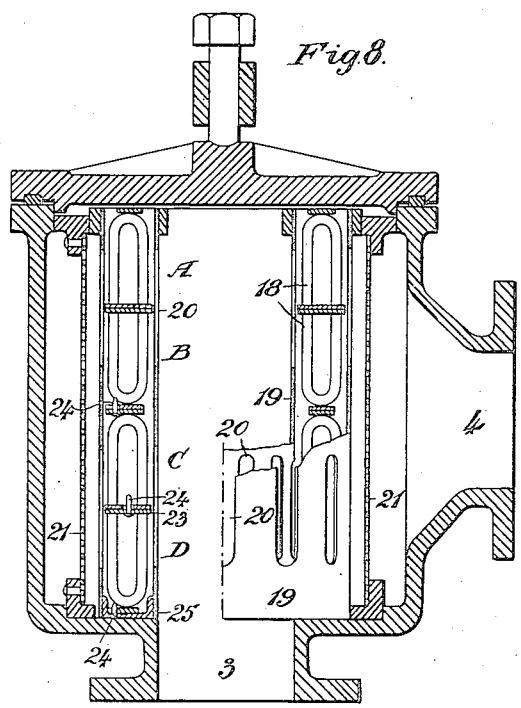
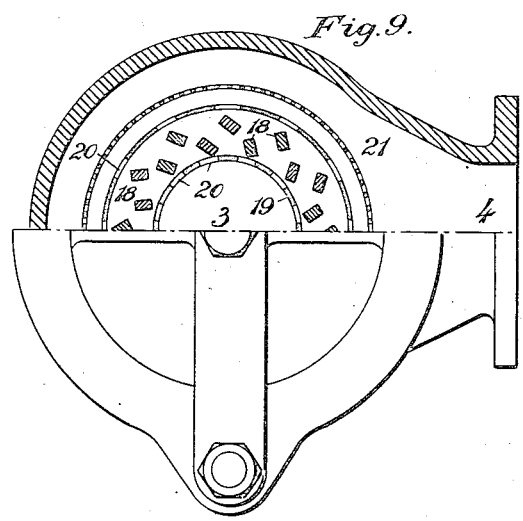

E. B. CHAPMAN.
MAGNETIC STRAINER APPARATUS FOR SEPARATING SOLIDS FROM LIQUIDS.
APPLICATION FILED NOV. 9, 1921.
1,425,366.
Patented Aug. 8, 1922.
5 SHEETS—SHEET 4.
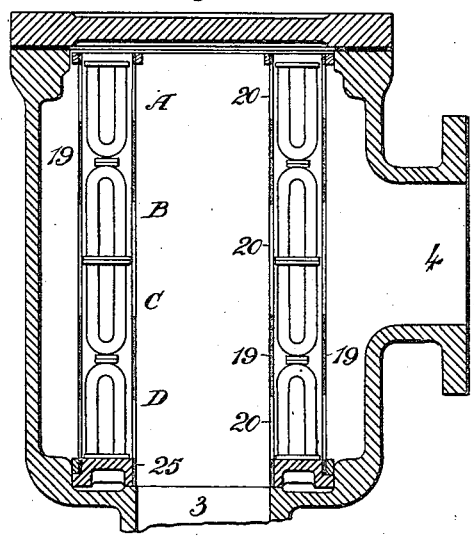
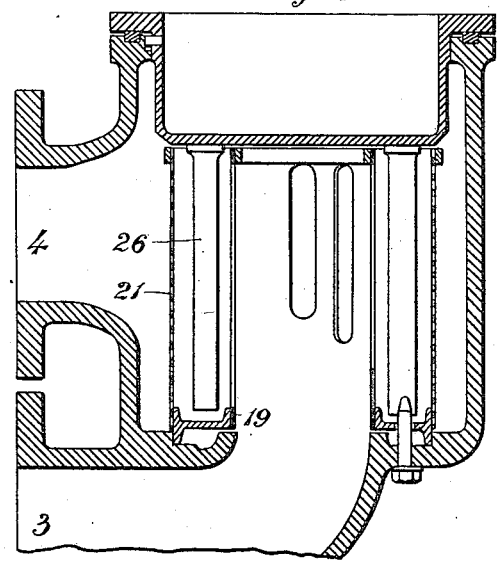
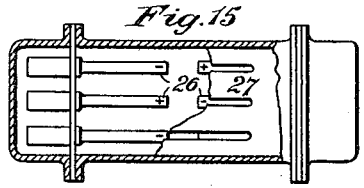 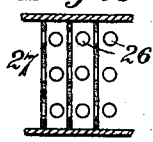
Inventor
Edward B. Chapman
by Herbert M. Jenner,
Attorney E. B. CHAPMAN.
MAGNETIC STRAINER APPARATUS FOR SEPARATING SOLIDS FROM LIQUIDS.
APPLICATION FILED NOV. 9, 1921.
1,425,366.
Patented Aug. 8, 1922.
5 SHEETS—SHEET 5.
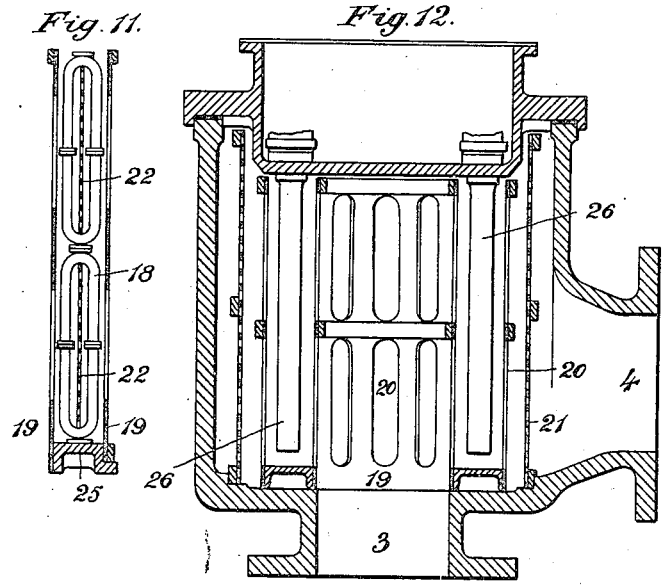
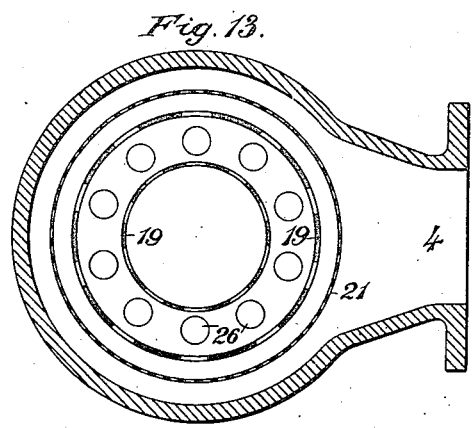
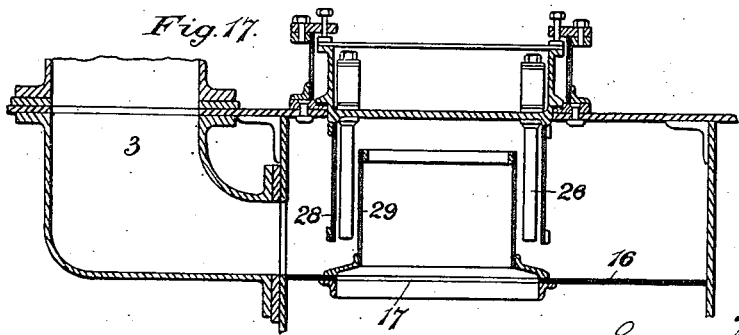

UNITED STATES PATENT OFFICE.

EDWARD BROOKS CHAPMAN, OF WHITLEY BAY, ENGLAND.

MAGNETIC STRAINER APPARATUS FOR SEPARATING SOLIDS FROM LIQUIDS.

1,425,366. Specification of Letters Patent. Patented Aug. 8, 1922.

Application filed November 9, 1921. Serial No. 514,036.

*To all whom it may concern:*

Be it known that I, EDWARD BROOKS CHAPMAN, a subject of the King of Great Britain and Ireland, residing at 33 Grosvenor Drive, Whitley Bay, Northumberland, England, have invented Improvements in Magnetic Strainer Apparatus for Separating Solids from Liquids, of which the following is a specification.

This invention relates to apparatus in which magnetic means are employed for the purpose of removing solids from liquids such as ferrous grit from oil in lubricating systems.

The object in view is to secure greater efficiency than heretofore and it is achieved broadly by employing magnetic elements combined with and arranged in such close and regular relationship to perforated means as to produce highly concentrated fields distributed uniformly with regard to such means.

The magnetic elements may be permanent magnets or cores electrically energized and the perforated means may either be a mechanical straining or filtering member or members for attachment to and magnetization by the elements, or a cage arrangement of non-magnetizable metal or material pierced or formed with openings at positions which will constrain the liquid to flow laterally in a uniform manner preferably past the more markedly magnetic portions of the individual magnets, the cage and magnet arrangement conjointly acting to effectually comb the liquid.

The invention may be carried into effect in numerous ways as will be evident from the examples of oil filter illustrated in the accompanying drawings, whereof Fig. 1 is a central vertical section and Fig. 2 a plan partly in section and with parts removed, of one form of electromagnetic apparatus. Fig. 3 is a view similar to Fig. 1 of a modification. Figs. 4 and 5 are views similar to Figs. 1 and 2 of another modification. Figs. 6 and 7 are corresponding views of yet another modification. Fig. 8 is a sectional elevation and Fig. 9 a sectional plan of one form of permanent magnet filter. Fig. 10 is a view similar to Fig. 8 of another form and Fig. 11 is a detail view of a modification. Figs. 12 and 13 are respectively a sectional elevation and plan of another electromagnetic filter. Fig. 14 is a view similar to Fig. 12 of a modification. Fig. 15 is a part sectional elevation, more or less diagrammatic, of yet another form of electromagnetic filter and Fig. 16 is a cross section of a portion thereof. Fig. 17 is a sectional elevation of a further form of electromagnetic filter.

Referring to the said drawings, Fig. 1 illustrates a known type of oil filtering apparatus embodying concentrically arranged perforated members 1, 2 with their axes vertical so that oil can flow vertically upward into the interior thereof by way of an inlet branch 3 and thereafter radially through the perforated members, leaving by the outlet branch 4. Such members 1, 2, of a magnetizable metal, may be magnetized by connecting them to a series of polar members 5, 6 carried by a non-magnetizable cover 7 and protruding therethrough to receive energizing coils 8 which may conveniently be connected in pairs, as shown in Fig. 2, in such a manner that the inner perforated member is magnetized with a polarity opposite to that of the outer member 2. The strainer members and coils can be collectively removed with the cover 7, which may have a separate removable lid or plate whereby access can be had to the coils.

An arrangement which however may sometimes be preferred is shown in Fig. 3 and comprises a body or casing having a liquid inlet 3 at one end and a liquid outlet at the other end with a box-like cover 7 of brass for example, for the reception of energizing coils, and polar members. Within this body, strainer members of a gauze-like character may be arranged depending from the cover to within a short distance, it may be, of the bottom of the body and attached at their lower end to a bottom plate 9 of brass or the like. Conveniently, and as shown, two cylindrically shaped filter members 1, 2 as aforesaid may be employed, the liquid inlet 3 of the body extending by way of a sleeve 10 through the outer member 2 into the inner member. If desired the filter members may be connected to the polar members by plug and socket means made and broken in the act of placing the cover in position and removing it.

Figs. 4 and 5 illustrate the invention applied to a drainer tank 11, there being two openings in the top 12 adapted to be closed by box-like covers 13 each containing polar members 14 attached to flat screen plates 15 extending downwardly near to a horizontal partition 16 having an opening 17 therein. The oil which enters at 3 flows as indicated by the arrows.

Apparatus of this character may also, as shown in Figs. 6 and 7 have combined therewith separate polar members 26 grouped say within a cylindrical filter member 2 or members. Conveniently such polar members, carried by the cover aforesaid, may be arranged circularly around a central member, the latter being shorter than the rest which increase in length in the successive circular series.

In the example shown in Figs. 8 and 9 a number of horseshoe magnets 18 are disposed in say four circular series A, B, C, D, the limbs of the magnets being disposed vertically and so that the polar extremities of the top and bottom series A, D are directed inwardly towards the centre of the body whilst the polar extremities of the two intermediate series B, C are directed respectively towards the top and bottom of the body, the said extremities of the two upper series as well as the extremities of the two lower series being consequently in more or less close proximity to one another and the magnets arranged so that unlike poles are in alignment, thereby producing strong localized fields. Between the magnets 18 and the liquid inlet 3 or the liquid outlet 4 or (as shown) both is or are arranged a cylindrical cage or cages 19 having two series of slots 20 or openings closely adjacent to the polar extremities of the magnets so that the liquid is caused to pass laterally through the magnetic fields. Or as shown in Fig. 10 the magnets 18 may be arranged so that the polar extremities of the two intermediate series B, C are adjacent to one another, the upper and lower series A and D being reversely arranged so that their polar extremities are free, in which case the inner or outer cage, or both cages, will have three series of openings 20 for directing the liquid across the fields.

In each case a cylindrical gauze strainer may be employed through which the liquid passes before or after encountering the arrangements described, an instance of the latter kind being shown in Figs. 8 and 9 where the gauze strainer is marked 21. Or strainers for both of these purposes may be employed, whilst as a further modification, shown in Fig. 11, strainers 22 may be disposed between the limbs of the several magnets 18 for use alone or in conjunction with an inner or outer strainer or two such strainers.

The magnets 18 may be arranged so that the planes containing the limbs thereof are inclined to lines passing radially from the centre of the body, as shown in Fig. 9, whereby the openings 20 in the inner and outer cages 19, when both are employed, occupy staggered positions causing the liquid to flow in other than radial paths.

The various magnets 18 of each series A, B, C, D furthermore may be attached as by screws, at the yoke or extremities or (as shown) at both of these places, to a ring or rings 23 of brass or other non-magnetic metal or material by which they are securely held together and readily removable in groups as a battery, and dowels 24 or other positioning means may be employed to insure the magnets being in proper register with the cage openings 20.

The cage or cages may be so constructed that it or they can be removed collectively with the magnets, both cages 19 in the examples being for this purpose shown as connected at the bottom by a ring 25.

A similar body with cage or cages 19 and strainer or strainers 21 may be employed equipped with a depending series of straight electromagnets of equal or unequal lengths, cross sectional areas or both. One such arrangement is shown in Figs. 12 and 13 where straight polar members 26, intended to be coupled in pairs, are disposed between the slotted cages 19. Fig. 14 shows a form of strainer in which the polar members 26 are disposed between a single cage 19 and an outer gauze strainer 21 the slots 20 in the cage 19 being of different lengths and the polar members of correspondingly varied lengths if desired.

Or as shown in Figs. 15 and 16, two series of electromagnets 26 may extend laterally inwards from the opposite sides of a body so that the extremities are in more or less close proximity to one another, the magnets being preferably so arranged that the polarity of one is unlike that of another adjacent thereto. The flow of the liquid across the various fields, vertically or laterally, is controlled by appropriately slotted cage plates 27 arranged therebetween.

Fig. 17 illustrates a drainer tank similar to that of Fig. 4, 28 being a slotted cage arranged between the inlet 3 and an upstanding trunk 29 surrounding the opening 17 in the partition 16. In this case the electromagnets 26 are disposed between the cage 28 and trunk 29.

In some cases perforated metal which has been permanently magnetized in any known or suitable way may be employed.

What I claim is:—

1. A magnetic strainer, comprising a body having a liquid inlet, a liquid outlet and an open top, a cover for said top, perforated plates extending downwardly from said cover, and polar members having straight limbs arranged parallel to said perforated plates and adapted to produce magnetic fields across which the liquid flows from the inlet to the outlet, the said perforated plates being collectively removable through the open top and the polar members being similarly nested for collective removal in the same way, substantially as described.

2. In a magnetic strainer, the combination with a body having a liquid inlet and a liquid outlet, of a pair of plates having a series of slits arranged parallel to one another, and polar members arranged in the space between the slotted plates and parallel to the slots therein, the said slots acting to guide the liquid transversely past the polar members.

3. In a magnetic strainer, the combination with a body having a liquid inlet and a liquid outlet, of a pair of concentrically arranged cages having slits extending axially thereof and polar members arranged in the space between the slotted members, the slots acting to guide the liquid transversely past the polar members.

4. In a magnetic strainer, the combination with a body having a liquid inlet and a liquid outlet, of a pair of concentrically arranged cages having slots extending axially thereof, and a nest of reversely arranged permanent magnets located in the space between the slotted cages with their limbs parallel to the slots aforesaid, the said slots acting to guide the liquid transversely past the limbs of the magnets, substantially as described.

5. In a magnetic strainer, the combination with a body having a liquid inlet and a liquid outlet, of a pair of concentrically arranged cages having slots extending axially thereof, polar members arranged in the space between the slotted cages, the slots acting to guide the liquid transversely past the polar members and a gauze strainer surrounding the outermost cylindrical cage, substantially as described.

6. In a magnetic strainer, the combination with a body having a liquid inlet and a liquid outlet, of a pair of concentrically arranged cages having slots extending axially thereof, a nest of reversely arranged permanent magnets located in the space between the slotted members with their limbs parallel to the slots aforesaid, the said slots acting to guide the liquid transversely past the limb of the magnets, and a gauze strainer surrounding the outermost cylindrical cage, substantially as described.

7. In a magnetic strainer, a pair of vertical and concentrically arranged cages having slots extending axially thereof, a ring connecting the cages at the bottom and a nest of magnets resting upon said ring in the space between the cages, the nest of magnets being removable from the space aforesaid from the end opposite to that at which the connecting ring is located, substantially as described.

Signed at the city and county of Newcastle-upon-Tyne, in England, this 20th day of October, 1921.

EDWARD BROOKS CHAPMAN.